United States Patent
Movahhed et al.

(10) Patent No.: US 12,378,348 B2
(45) Date of Patent: *Aug. 5, 2025

(54) METHOD FOR THE PRODUCTION OF A THERMOPLASTIC POLYOXAZOLIDINONE

(71) Applicant: Covestro Deutschland AG, Leverkusen (DE)

(72) Inventors: Sohajl Movahhed, Cologne (DE); Stefan Westhues, Leverkusen (DE); Daniel Thiel, Leverkusen (DE); Kai Laemmerhold, Odenthal (DE); Aurel Wolf, Wülfrath (DE); Christoph Guertler, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 330 days.

This patent is subject to a terminal disclaimer.

(21) Appl. No.: 18/017,116

(22) PCT Filed: Aug. 17, 2021

(86) PCT No.: PCT/EP2021/072796
§ 371 (c)(1),
(2) Date: Jan. 20, 2023

(87) PCT Pub. No.: WO2022/043127
PCT Pub. Date: Mar. 3, 2022

(65) Prior Publication Data
US 2023/0220144 A1    Jul. 13, 2023

(30) Foreign Application Priority Data

Aug. 24, 2020 (EP) .................................. 20192501
Feb. 22, 2021 (EP) .................................. 21158367

(51) Int. Cl.
| | |
|---|---|
| C08G 18/00 | (2006.01) |
| C08G 18/16 | (2006.01) |
| C08G 18/76 | (2006.01) |
| C08G 59/40 | (2006.01) |

(52) U.S. Cl.
CPC ......... *C08G 18/003* (2013.01); *C08G 18/168* (2013.01); *C08G 18/7671* (2013.01); *C08G 59/4028* (2013.01)

(58) Field of Classification Search
CPC ................ C08G 18/003; C08G 18/168; C08G 18/7671; C08G 59/4028
See application file for complete search history.

(56) References Cited

U.S. PATENT DOCUMENTS

2021/0253772 A1* 8/2021 Ekin .................... C08G 18/003

FOREIGN PATENT DOCUMENTS

| | | |
|---|---|---|
| WO | 2019052991 A1 | 3/2019 |
| WO | 2019/063391 A1 | 4/2019 |

OTHER PUBLICATIONS

International Search Report for International Patent Application No. PCT/EP2021/072796, mailed Oct. 29, 2021.
Written Opinion for International Patent Application No. PCT/EP2021/072796, mailed Oct. 29, 2021.

* cited by examiner

*Primary Examiner* — Rabon A Sergent
(74) *Attorney, Agent, or Firm* — K&L Gates LLP

(57) ABSTRACT

A process for producing a thermoplastic polyoxazolidinone comprising copolymerizing a diisocyanate compound (A) with a bisepoxide compound (B) in the presence of a specific a quaternary ammonium, quaternary phoshonium and/or quaternary stibonium-based catalyst (C), a compound (D), a compound (F) wherein compound (D) and compound (F) independently comprises at least one of a monofunctional isocyanate, a monofunctional epoxide, a cyclic carbonate, a monofunctional alcohol, a monofunctional amine optionally in a solvent (E), and wherein the catalyst (C) is added in at least two portions (C-1) and (C-2). The invention is also related to the resulting thermoplastic polyoxazolidinone.

20 Claims, No Drawings

METHOD FOR THE PRODUCTION OF A THERMOPLASTIC POLYOXAZOLIDINONE

CROSS REFERENCE TO RELATED APPLICATIONS

This application is a U.S. national stage application, filed under 35 U.S.C. § 371, of International Application No. PCT/EP2021/072796, which was filed on Aug. 17, 2021, which claims priority to European Patent Application No. 21158367.9, which was filed on Feb. 22, 2021, and to European Patent Application No. 20192501.3, which was filed on Aug. 24, 2020. The contents of each are hereby incorporated by reference into this specification.

FIELD

The present disclosure relates to a process for producing a thermoplastic polyoxazolidinone comprising copolymerizing a diisocyanate compound (A) with a bisepoxide compound (B) in the presence of a specific a quaternary ammonium, quaternary phoshonium and/or quaternary stibonium-based catalyst (C), a compound (D), a compound (F) wherein compound (D) and compound (F) independently comprises at least one of a monofunctional isocyanate, a monofunctional epoxide, a cyclic carbonate, a monofunctional alcohol, a monofunctional amine optionally in a solvent (E), and wherein the catalyst (C) is added in at least two portions (C-1) and (C-2). The present disclosure is also related to the resulting thermoplastic polyoxazolidinone.

BACKGROUND

Oxazolidinones are widely used structural motifs in pharmaceutical applications and the cycloaddition of epoxides and isocyanates seems to be a convenient one-pot synthetic route to it. Expensive catalysts, reactive polar solvents, long reaction times and low chemoselectivities are common in early reports for the synthesis of oxazolidinones (M. E. Dyen and D. Swern, Chem. Rev., 67, 197, 1967). Due to these disadvantages there was the need for alternative methods for the production of oxazolidinones especially for application of oxazolidinones as structural motif in polymer applications.

The scientific publication J. Polym. Sci. 8 (1970) 2759-2773 discloses polyoxazolidinones prepared from various bisepoxides and various diisocyanates in the presence of alkaline metal halogenide catalysts. A solution of equimolar bisepoxide and diisocyanate amounts is added dropwise to a reactor containing a LiCl catalyst dissolved in DMF under reflux conditions within 1 h and a subsequent post reaction of 12 to 23 h was carried out under reflux conditions in order to complete the reaction. The addition of monofunctional chain-group regulators is not disclosed.

WO 2015/173110 A1 and WO 2016/128380 A1 disclose a process for the production of a polyoxazolidinone by reaction of a diisocyanate, a bisepoxide and a monofunctional isocyanate in the presence of a phoshonium based catalyst and N-Methylpyrrolidone as high boiling solvent.

WO 2019/052991 A1 and WO 2019/052994 A1 disclose processes for producing thermoplastic polyoxazolidinone comprising copolymerization of a diisocyanate compound with a bisepoxide compound and a monofunctional epoxide in the presence of Lithium chloride and Lithium bromide as catalysts in N-Methylpyrrolidone and sulfolane as high boiling co-solvents.

WO 2018/149844 A1 disclose a process for the production of a polyoxazolidinone by reaction of a diisocyanate and a bisepoxide using an ionic liquid as a catalyst in sulfolane as a high boiling co-solvent. The use of a monofunctional epoxide in addition to the bisepoxide is not disclosed. The resulting oxazolidinone product contains significant amounts of the isocyanurate by trimerization of the diisocyanate as a second product with an oxazolidinone to isocyanurate ratio of 0.62 to 0.71 determined by IR spectroscopy.

WO 2020/016276 A1 disclose a process for the production of a polyoxazolidinone by bulk polymerisation of a diisocyanate and a bisepoxide using an ionic liquid as a catalyst in the absence of a solvent, wherein the reaction temperature is increased during the addition of the diisocyanate. The use of a monofunctional epoxide in addition to the bisepoxide is not disclosed.

SUMMARY

Objective of the present invention was therefore to identify an optimized and simple process for the preparation of thermoplastic polyoxazolidinones with an improved or at least comparable thermal stability and a lower polydispersity than the already known thermoplastic polyoxazolidinones by the polyaddition route. Especially, suitable process conditions should be developed e.g. by introducing a suitable catalyst system to obtain a polyoxazolidinone product with a high chemical selectivity and reducing the amount of unwanted side products like isocyanurates that causes unwanted cross-linking of the reaction product and negatively impact the thermoplastic properties. Thus, a high oxazolidinone to isocyanurate ratio is desirable to gain good thermoplastic properties for the subsequent shaping processes.

Beside the high oxazolidinone to isocyanurate ratio also a high conversion rate of the isocyanate epoxide compound should be obtainable by the polyaddition route in order to receive a thermoplastic polyoxazolidinones with a defined molecular weight and a narrow molecular weight distribution (narrow PDI value) and also reduce the technical complexity for the down streaming process. A narrow PDI can lead to a more practical viscosity of the polymer melt, thus enabling an improved processing of the thermoplastic material.

Surprisingly, it has been found that the problem can be solved by a process for producing a thermoplastic polyoxazolidinone comprising copolymerizing a diisocyanate compound (A) with a bisepoxide compound (B) in the presence of a catalyst (C), a compound (D), and a compound (F) optionally in a solvent (E);

wherein the catalyst (C) is represented by the formula (I)

$$[A]^+_n[Y]^{n-} \qquad (I)$$

wherein n is an integer having a value of 1, 2, or 3;
wherein $[A]^+_n$ is a quaternary ammonium, quaternary phoshonium and/or quaternary stibonium; preferably phosphonium wherein $[Y]^-$ is a monovalent, divalent, trivalent or tetravalent anion preferably a monovalent anion; wherein the compound (D) comprises at least one of a monofunctional isocyanate, a monofunctional epoxide, a cyclic carbonate, a monofunctional alcohol, a monofunctional amine preferably a monofunctional epoxide; wherein the compound (F) comprises at least one of a monofunctional isocyanate, a monofunctional epoxide, a cyclic carbonate, a monofunctional alcohol, a monofunctional amine preferably a monofunctional epoxide; wherein the catalyst (C) is added in at least two portions comprising a first portion (C-1) and a second portion (C-2), and wherein the process comprising:

(α) reacting of the diisocyanate compound (A) with the bisepoxide compound (B) in the presence of the catalyst (C) and the compound (D) that is optionally in the solvent (E) forming an intermediate compound; and (β) reacting the compound (F) with the intermediate compound formed in step (α).

DETAILED DESCRIPTION

As used herein, the term "thermoplastic polyoxazolidinone" is meant to denote compounds containing at least two oxazolidinone groups in the molecule. The thermoplastic polyoxazolidinone are obtainable by the reaction of a diisocyanate compound with a bisepoxide compound.

In an embodiment of the invention the process step (α) comprises:

(α-1) placing the solvent (E) and the catalyst (C) in the reactor to provide a mixture (α-1), (α-2) placing the compound (A), the bisepoxide compound (B) and the compound (D) in a second vessel to provide a mixture (α-2), and (α-3) adding the mixture (α-2) to the mixture (α-1) and forming a copolymerization reaction product.

The copolymerization reaction product is the reaction product of the diisocyanate compound (A) with the bisepoxide compound (B) and with the compound (D).

In a preferred embodiment of the invention the mixture (α-2) is added in step (α-3) in a continuous manner to the mixture (α-1). In an alternative less-preferred embodiment of the invention to the continuous addition step the mixture (α-2) is added in a step-wise manner with two or more individual addition steps to the mixture (α-1).

In a preferred embodiment of the invention step (α) further comprises (α-4) adding the second portion (C-2) of the catalyst (C) to the copolymerization reaction product formed in step (α-3).

In an embodiment of the method according to the invention step (α) is performed at reaction temperatures of ≥130° C. to ≤280° C., preferably at a temperature of ≥140° C. to ≤240° C., more preferred at a temperature of ≥155° C. to ≤210° C. If temperatures below 130° C. are set, the reaction is generally very slow and also side products like isocyanurates are formed. At temperatures above 280° C., the amount of undesirable secondary products increases considerably.

In an embodiment of the method according to the invention step (α) is performed at reaction times of 1 h to 20 h, preferably at 1 h to 10 h and more preferably at 1 h to 6 h.

In an embodiment of the method according to the invention step (α) is performed at reaction temperatures of ≥130° C. to ≤280° C. and a reaction time of 1 h to 6 h.

In an embodiment of the method according to the invention step (β) is performed at reaction temperatures of ≥130° C. to ≤280° C., preferably at a temperature of ≥140° C. to ≤240° C., more preferred at a temperature of ≥155° C. to ≤210° C. If temperatures below 130° C. are set, the reaction is generally very slow. At temperatures above 280° C., the amount of undesirable secondary products increases considerably.

In an embodiment of the method according to the invention step (β) is performed at reaction times of 1 h to 20 h, preferably at 1 h to 10 h and more preferably at 1 h to 6 h.

In an embodiment of the method according to the invention step (β) is performed at reaction temperatures of ≥130° C. to ≤280° C. and a reaction time of 1 h to 6 h.

As used herein, the term "diisocyanate compound (A)" is meant to denote diisocyanate compounds having two isocyanate groups (I=2), isocyanate-terminated biurets, isocyanurates, uretdiones, carbamates and/or isocyanate-terminated prepolymers.

In an embodiment of the method according to the invention the diisocyanate compound (A) is at least one compound selected from the group consisting of tetramethylene diisocyanate, hexamethylene diisocyanate (HDI), 2-methylpentamethylene diisocyanate, 2,2,4-trimethyl-hexamethylene diisocyanate (THDI), dodecanemethylene diisocyanate, 1,4-diisocyanatocyclohexane, 3-isocyanatomethyl-3,3,5-trimethylcyclohexyl isocyanate (isophorone diisocyanate, IPDI), diisocyanatodicyclohexylmethane (H12-MDI), diphenylmethane diisocyanate (MDI), 4,4'-diisocyanato-3,3'-dimethyldicyclohexylmethane, 4,4'-diisocyanato-2,2-dicyclohexyl propane, poly(hexamethylene diisocyanate), octamethylene diisocyanate, tolylene-α,4-diisocyanate, poly (propylene glycol) tolylene-2,4-diisocyanate terminated, poly(ethylene adipate) tolylene-2,4-diisocyanate terminated, 2,4,6-trimethyl-1,3-phenylene diisocyanate, 4-chloro-6-methyl-1,3-phenylene diisocyanate, poly[1,4-phenylene diisocyanate-co-poly(1,4-butanediol)] diisocyanate, poly(tetrafluoroethylene oxide-co-difluoromethylene oxide) α,ω-diisocyanate, 1,4-diisocyanatobutane, 1,8-diisocyanatooctane, 1,3-bis(1-isocyanato-1-methylethyl) benzene, 3,3'-dimethyl-4,4'-biphenylene diisocyanate, naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers, 4,4'-, 2,4'- or 2,2'-diisocyanatodiphenylmethane or mixtures of these isomers, 4,4'-, 2,4'- or 2,2'-diisocyanato-2,2-diphenylpropane-p-xylene diisocyanate and α,α,α',α'-tetramethyl-m- or -p-xylene diisocyanate (TMXDI) and biurets, isocyanurates, carbamates and uretdiones of the aforementioned isocyanates.

More preferred the diisocyanate compound (A) is selected from the group comprising of tolylene-α,4-diisocyanate, poly(propylene glycol) tolylene-2,4-diisocyanate terminated, 2,4,6-trimethyl-1,3-phenylene diisocyanate, 4-chloro-6-methyl-1,3-phenylene diisocyanate, 3,3'-dimethyl-4,4'-biphenylene diisocyanate, 4,4'-, 2,4'- or 2,2'-diisocyanatodiphenylmethane or mixtures of these isomers, 4,4'-, 2,4'- or 2,2'-diisocyanato-2,2-diphenylpropane-p-xylene diisocyanate and α,α,α',α'-tetramethyl-m- or -p-xylene diisocyanate (TMXDI), diphenylmethane diisocyanate (MDI), naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers.

And most preferred the diisocyanate compound (A) is selected from the group consisting of diphenylmethane diisocyanate (MDI), naphthalene-1,5-diisocyanate, 1,3-phenylene diisocyanate, 1,4-diisocyanatobenzene, 2,4- or 2,5- and 2,6-diisocyanatotoluene (TDI) or mixtures of these isomers.

In a further preferred embodiment of the invention the diisocyanate compound (A) is added in at least two portions (A-1) and (A-2).

In a further preferred embodiment comprises adding the second portion (A-2) of the diisocyanate compound (A), the compound (D) the in the solvent (E) in step (α-4). The presence of the solvent (E) reduces the temperature increase due to dilution of the exothermal reaction forming the thermoplastic polyoxazolidinone in the reactor. Furthermore, the presence of the solvent (E) reduces the viscosity of the reaction system, so no technically complex high-viscosity technology is needed.

A mixture of two or more of the aforementioned diisocyanate compounds (A) can also be used.

As used herein, the term "bisepoxide compound (B)" is meant to denote diepoxide compounds having two epoxide groups (F=2).

In a preferred embodiment of the invention the bisepoxide compound (B) is at least one compound selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S diglycidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidyl ether and diglycidyl isophthalate.

More preferred the bisepoxide compound (B) is selected from the group consisting of resorcinol diglycidyl ether, bisphenol A diglycidyl ether, and bisphenol F diglycidyl ether.

Most preferred the bisepoxide compound (B) is selected from the group consisting of bisphenol A diglycidyl ether, and bisphenol F diglycidyl ether.

In a further preferred embodiment of the invention the bisepoxide compound (B) comprises an epoxy-terminated oxazolidone-based prepolymer, wherein this epoxy-terminated oxazolidone-based prepolymer leads to less-coloured thermoplastic polyoxazolidinones (lower Gardener Colour).

In a more preferred embodiment the epoxy-terminated oxazolidone-based prepolymer consists at least 90 mol-%, preferably 95 mol-% more preferably 98 mol-%, of the bisepoxide compound (B).

In a preferred embodiment of the invention the epoxy-terminated oxazolidone-based prepolymer is formed in step (α-3).

In a preferred embodiment of the invention the epoxy-terminated oxazolidone-based prepolymer formed in step (α-3) is the copolymerization reaction product of a first portion (A-1) of the diisocyanate compound (A) with the bisepoxide compound (B) in the presence of the first portion (C-1) of the catalyst (C) optionally in the solvent (E) wherein the molar ratio of the epoxy groups of the polyepoxide compound (B) to the isocyanate groups of the first portion (A-1) of the polyisocyanate compound (A) is from 1.1:1 to less than 25:1 preferably from 1.4:1 to less than 5:1.

In a preferred embodiment of the invention the epoxy-terminated oxazolidone-based prepolymer is formed in the absence of the solvent (E). Thus, no solvent (E) need to be remove by a time and energy intensive separation process, e.g. distillation process. Furthermore, also the overall solvent amount for the production of the thermoplastic polyoxazolidinone can be reduced.

In a preferred embodiment of the invention, the process for the preparation of the epoxy-terminated oxazolidone-based prepolymer comprises the steps:
i) Mixing the first portion (A-1) of the diisocyanate compound (A) with the bisepoxide compound (B) and the first catalyst portion (C-1) of the catalyst (C) forming a mixture (i);
ii) Copolymerizing the mixture (i)

In an alternative preferred embodiment of the invention, the process for the preparation of the epoxy-terminated oxazolidone-based prepolymer comprises the steps:
a) Mixing the polyepoxide compound (B) and the first catalyst portion (C-1) of the catalyst (C) forming a mixture (a);
b) Addition of the first portion (A-1) of the diisocyanate compound (A) to the mixture (a) at copolymerization conditions.

A mixture of two or more of the aforementioned bisepoxide compounds (B), two or more of the aforementioned epoxy-terminated oxazolidone-based prepolymer can also be used. Also a mixture of the aforementioned bisepoxide compounds (B) and the epoxy-terminated oxazolidone-based prepolymer can also be used.

The molecular weight of the obtained thermoplastic polyoxazolidinone is determined by the molar ratio of the bisepoxide compound (B) relative to diisocyanate compound (A) and optionally relative to the compound (D).

The molar ratio of bisepoxide compound (B) to diisocyanate compound (A) is preferably in the range from 1:2 to 2:1, more preferably in the range from 45:55 to 2:1 and even more preferably in the range 47.8:52.2 to 52.2:47.8.

When the diisocyanate compound (A) is employed in excess, preferably a mono-epoxide is employed as compound (D). When the bisepoxide compound (B) is employed in excess, preferably a mono-isocyanate is employed as compound (D).

In an embodiment of the invention the catalyst (C) comprises at least one of a tetraalkylphosphonium halogenide, a tetracycloalkylphosphonium halogenide, a tetraarylphosphonium halogenide, a tetraalkylammonium halogenide, a tetracycloalkylammonium halogenide, and/or a tetraarylammonium halogenide, preferred a tetraalkylphosphonium halogenide, a tetracycloalkylphosphonium halogenide, and a tetraarylphosphonium halogenide.

In a preferred embodiment of the invention the catalyst (C) is at least one compound selected from the group consisting of tetramethylammonium bromide, tetraethylammonium bromide, tetrapropylammonium bromide, tetrabutylammonium bromide, tetrapentylammonium bromide, tetrahexylammonium bromide, tetraheptylammonium bromide, tetraoctylammonium bromide, tetramethylammonium chloride, tetraethylammonium chloride, tetrapropylammonium chloride, tetrabutylammonium chloride, tetrapentylammonium chloride, tetrahexylammonium chloride, tetraheptylammonium chloride, tetraoctylammonium chloride, tetraphenylphosphonium chloride, tetraphenylphosphonium bromide, tetraphenylphosphonium iodide, bis(triphenylphosphine)iminium chloride, tetraphenylphosphonium nitrate, tetraphenylphosphonium carbonate and compounds represented by the formula (I)

$$[A]^+_n[Y]^{n-} \quad (I)$$

wherein $[A]_n^+$ is at least one compound selected from the group consisting of p-phenoltriphenyl-phosphonium;

p-phenoltriphenyl-ammonium; p-chlorobenzene triphenyl-phosphonium; ethyl-ammonium; methyltrioctyl-ammonium; cholin; 1-allyl-3-methyl-imidazolium; 1-butyl-2,3-dimethyl-imidazolium; 1-butyl-3-methyl-imidazolium; 1,2-dimethyl-3-propyl-imidazolium; 1,3-dimethyl-imidazolium; 1-ethyl-3-methyl-imidazolium; 1-hexadecyl-3-methyl-imidazolium; 1-hexyl-3-methyl-imidazolium; 1-methyl-3-octyl-imidazolium; 1-methyl-3-propyl-imidazolium; trihexyltetradecyl-phosphonium; 1-methyl-1-propyl piperidinium; 1-butyl-pyridinium; 1-butyl methyl-pyridinium; 1-butyl-4-methyl-pyridinium; 1-butyl-1-methyl-pyrrolidinium; 1-methyl-1-propyl-pyrrolidinium; triethylsulfonium wherein $[Y]^{n-}$ is at least one compound selected from the group consisting of bis(trifluoromethyl-sulfonyl)imide; iodide; bromide; chloride; dicyanamide; diethyl phosphate; dihydrogen phosphate; dimethyl phosphate; ethyl sulfate; hexafluorophosphate; hydrogensulfate; nitrate; tetrafluoroborate; thiocyanate; triflate.

In a more preferred embodiment of the invention the catalyst (C) is at least one compound selected from the group consisting of tetramethylammonium bromide, tetraethylammonium bromide, tetrapropylammonium bromide, tetrabutylammonium bromide, tetrapentylammonium bromide, tetrahexylammonium bromide, tetraheptylammonium bromide, tetraoctylammonium bromide, tetramethylammonium chloride, tetraethylammonium chloride, tetrapropylammonium chloride, tetrabutylammonium chloride, tetrapentylammonium chloride, tetrahexylammonium chloride, tetraheptylammonium chloride, tetraoctylammonium chloride, tetraphenylphosphonium chloride, tetraphenylphosphonium bromide, tetraphenylphosphonium iodide, bis(triphenylphosphine)iminium chloride, tetraphenylphosphonium nitrate, tetraphenylphosphonium carbonate.

In an even more preferred embodiment of the invention the catalyst (C) is at least one compound selected from the group consisting of tetraphenylphosphonium chloride, tetraphenylphosphonium bromide, tetraphenylphosphonium iodide, bis(triphenylphosphine)iminium chloride, tetraphenylphosphonium nitrate, tetraphenylphosphonium carbonate.

In a most preferred embodiment of the invention the catalyst (C) is at least one compound selected from the group consisting of tetraphenylphosphonium chloride, tetraphenylphosphonium bromide and tetraphenylphosphonium iodide.

In a preferred embodiment of the invention the first portion (C-1) of the catalyst (C) is added in step (α-1).

In a more preferred embodiment of the invention step (α) further comprises (α-4) adding the second portion (C-2) of the catalyst (C) to the copolymerization reaction product formed in step (α-3).

In a more preferred embodiment of the invention the molar ratio of the first portion (C-1) of the catalyst (C) to the second portion (C-2) of the catalyst (C) is from 0.05:1 to 1:2 preferred 0.2:1 to 1:1.

In one embodiment of the method according to the invention, the catalyst (C) is present in an amount of ≥0.001 to ≤5.0 weight-%, preferably in an amount of ≥0.01 to ≤3.0 weight-%, more preferred ≥0.05 to ≤2.0 weight-%, based on the theoretical yield of thermoplastic polyoxazolidinone.

According to the invention compound (D) is one or more compounds selected from the group consisting of a monofunctional isocyanate, a monofunctional epoxide, a cyclic carbonate, a monofunctional alcohol, a monofunctional amine preferred a monofunctional epoxide, wherein the compound (D) acts as a chain regulator for the thermoplastic polyoxazolidinone and further increases the thermal stability of the thermoplastic polyoxazolidinone.

In an embodiment of the invention the compound (D) is a branched, an unbranched aliphatic, an alicyclic and/or an aromatic monofunctional alcohol.

Suitable monofunctional alcohols are for example linear primary alcohols such as methanol, ethanol, propanol, n-butanol, n-pentanol, n-hexanol, n-heptanol, n-octanol, n-nonanol, n-decanol, n-dodecanol, n-tetradecanol, n-hexadecanol, n-octadecanol and n-eicosanol. Suitable branched primary monofunctional alcohols are for example isobutanol, isopentanol, isohexanol, isooctanol, isostearyl alcohol and isopalmityl alcohol, 2-ethylhexyl alcohol, 3-n-propyl heptyl alcohol, 2-n-propyl heptyl alcohol, and 3-isopropyl heptyl alcohol. Suitable secondary monofunctional alcohols are for example isopropanol, sec-butanol, sec-pentanol (pentane-2-ol), pentane-3-ol, cyclopentanol, cyclohexanol, sec-hexanol (hexane-2-ol), hexane-3-ol, sec-heptanol (heptane-2-ol), heptane-3-ol, sec-decanol and decan-3-ol. Examples of suitable tertiary monofunctional alcohols are tert-butanol and tert-amyl alcohol.

Aromatic monofunctional alcohols such as phenol, cresol, thymol, benzyl alcohol and 2-phenylethanol can also be used.

In a further embodiment of the invention the compound (D) is a branched, an unbranched aliphatic, a alicyclic and/or an aromatic monofunctional isocyanate.

Suitable monofunctional isocyanates are for example n-hexylisocyanate, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentyl-phenyl isocyanate, 4-t-butyl phenyl isocyanate, 1-naphthyl isocyanat In an embodiment of the invention the compound (D) is a branched, anunbranched aliphatic, an alicyclic and/or an aromatic monofunctional amine. Specific examples of the aliphatic monofunctional amine include hexylamine, heptylamine, octylamine, nonylamine, decylamine, undecylamine, dodecylamine, tridecylamine, tetradecylamine, pentadecylamine, hexadecylamine, heptadecyl. Examples include amine, octadecylamine, nonadecylamine, icosylamine, henecosylamine, docosylamin. Specific examples of the alicyclic monofunctional amine include cyclohexylamine, 2-methylcyclohexylamine, 3-methylcyclohexylamine, 4-methylcyclohexylamine, 2,3-dimethylcyclohexylamine, 2,4-dimethylcyclohexylamine, 2-ethylcyclohexylamine, 3-ethylcyclohexylamine, 4-ethylcyclohexylamine, 2-n-propylcyclohexylamine, 3-n-propylcyclohexylamine, 4-n-propylcyclohexylamine, 2-iso-propylcyclohexylamine, 3-iso-propylcyclohexylamine, 4-iso-propylcyclohexylamine, 2-n-butylcyclohexylamine, 3-n-butylcyclohexylamine, 4-n-butylcyclohexyl Silamine, 2-iso-butylcyclohexylamine, 3-iso-butylcyclohexylamine, 4-iso-butylcyclohexylamine, 2-tert-butylcyclohexylamine, 3-tert-butylcyclohexylamine, 4-tert-butylcyclohexylamine, 2-n-octylcyclohexylamine, 3-n-octylcyclohexylamine, 4-n-octylcyclohexylamine, cyclohexylmethylamine, 2-methylcyclohexylmethylamine, 3-methylcyclohexylmethylamine, 4-methylcyclohexylmethylamine, dimethyl Cyclohexylmethyl amine, trimethylcyclohexylmethylamine, methoxycyclohexylmethylamine, ethoxycyclohexylmethylamine, dimethyl Carboxymethyl cyclohexylmethyl amine, methoxy cyclohexylethylamine, dimethoxy cyclohexylethylamine, methylcyclohexylamine propylamine, dodecylamine cyclohexylamine.

Specific examples of the aromatic monofunctional amine include aniline, 1-naphthylamine, 2-naphthylamine, 1-aminoanthracene, o-toluidine, p-toluidine, m-toluidine, 2-ethylaniline, 3-ethylaniline, 4-Ethylaniline, 2-propylaniline, 3-propylaniline, 4-propylaniline, cumidine, 2-n-butylaniline, 3-n-butylaniline, 4-n-butylaniline, 2-isobutylaniline, 3-isobutyl Aniline, 4-isobutylaniline, 2-sec-butylaniline, 3-sec-butylaniline, 4-sec-butylaniline, 2-tert-butylaniline, 3-tert-butylaniline, 4-tert-butylaniline, 2-N-pentylaniline, 3-n-pentylaniline 4-n-pentylaniline, 2-isopentylaniline, 3-isopentylaniline, 4-isopentylaniline, 2-sec-pentylaniline, 3-sec-pentylaniline, 4-sec-pentylaniline, 2-tert-Pentylaniline, 3-tert-pentylaniline, 4-tert-pentylaniline, 2-hexylaniline, 3-hexylaniline, 4-hexylaniline, 2-heptylaniline, 3-heptylaniline, 4-heptylaniline, 2-Octylaniline, 3-octylaniline, 4-octylaniline, 2-nonylaniline, 3-nonylaniline, 4-nonylaniline, 2-decylaniline, 3-decylaniline, 4-decylaniline, cyclohexylaniline, diphenylamine, dimethylaniline, Diethylaniline, dipropylaniline, diisopropylaniline, di-n-butylaniline, di-sec-butylaniline, di-tert-butylaniline, trimethylaniline, triethylaniline, tripropylaniline, tri-tert-butylaniline, Anisidine, ethoxyaniline, dimethoxyaniline, diethoxyaniline, trimethoxyaniline, tri-n-butoxyaniline, benzylamine, methylbenzylamine, dimethylbenzylamine, trimethylbenzylamine, methoxybenzylamine, ethoxybenzylamine, dimethoxybenzylamine, α-phenylethylamine, β-phenylethylamine, methoxyphenylethylamine, dimethoxyphenylethylamine, α-phenylpropylamine, β Phenylpropylamine, .gamma. phenylpropylamine, methyl phenylpropylamine.

In an embodiment of the invention the compound (D) is at least one compound selected from the group consisting of 4-phenyl-1,3-dioxolan-2-one (styrene carbonate), 1,3-dioxolan-2-one (ethylene carbonate), 4-Methyl-1,3-dioxolan-2-one (propylene carbonate).

In a preferred embodiment of the invention the compound (D) is at least one compound selected from the group consisting of phenyl glycidyl ether, o-cresyl glycidyl ether, m-cresyl glycidyl ether, p-cresyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide, N-glycidyl phthalimide, and 4-tert-butylphenyl glycidyl ether.

In a preferred embodiment of the invention the compound (D) is 4-tert-butylphenyl glycidyl ether and/or phenyl glycidyl ether and/or o-cresyl glycidyl ether and/or styrene oxide.

In one embodiment of the method according to the invention, the compound (D) is present in an amount of ≥0.1 to ≤7.0 weight-%, preferably in an amount of ≥0.2 to ≤5.0 weight-%, more preferred ≥0.5 to ≤3.0 weight-%, based on the theoretical yield of thermoplastic polyoxazolidinone.

In an embodiment of the invention the process is performed in non-protic halogenated aromatic solvents, high-boiling non-protic aliphatic heterocyclic solvents, halogenated aromatic or aliphatic heterocyclic solvents with a boiling point equal or lower than 200° C., preferably equal or lower than 190° C. and more preferably equal or lower than 180° C. at 1 bar (absolute).

In an preferred embodiment of the invention the process is in the presence of a solvent (E) wherein the solvent (E) is one or more compounds and is selected from the group consisting of chlorobenzene, the different isomers of dichlorobenzene, dimethylformamide, N,N-dimethylacetamide, tetrahydrofurane, acetone, methyl ethyl ketone, 1,2-Dimethoxyethane, 1-Methoxy-2-(2-methoxyethoxy)ethane, the different isomers of dioxane preferably chlorobenzene and o-dichlorobenzene.

According to the invention compound (F) is one or more compounds selected from the group consisting of a monofunctional isocyanate, a monofunctional epoxide, a cyclic carbonate, a monofunctional alcohol, a monofunctional amine preferred a monofunctional epoxide, wherein the compound (F) acts as a chain regulator for the thermoplastic polyoxazolidinone and further increases the thermal stability of the thermoplastic polyoxazolidinone.

In an embodiment of the invention the compound (F) is a branched, an unbranched aliphatic, an alicyclic and/or an aromatic monofunctional alcohol.

Suitable monofunctional alcohols are for example linear primary alcohols such as methanol, ethanol, propanol, n-butanol, n-pentanol, n-hexanol, n-heptanol, n-octanol, n-nonanol, n-decanol, n-dodecanol, n-tetradecanol, n-hexadecanol, n-octadecanol and n-eicosanol. Suitable branched primary monofunctional alcohols are for example isobutanol, isopentanol, isohexanol, isooctanol, isostearyl alcohol and iso-palmityl alcohol, 2-ethylhexyl alcohol, 3-n-propyl heptyl alcohol, 2-n-propyl heptyl alcohol, and 3-isopropyl heptyl alcohol. Suitable secondary monofunctional alcohols are for example isopropanol, sec-butanol, sec-pentanol (pentane-2-ol), pentane-3-ol, cyclopentanol, cyclohexanol, sec-hexanol (hexane-2-ol), hexane-3-ol, sec-heptanol (heptane-2-ol), heptane-3-ol, sec-decanol and decan-3-ol. Examples of suitable tertiary monofunctional alcohols are tert-butanol and tert-amyl alcohol.

Aromatic monofunctional alcohols such as phenol, cresol, thymol, benzyl alcohol and 2-phenylethanol can also be used.

In a further embodiment of the invention the compound (F) is a branched, an unbranched aliphatic, a alicyclic and/or an aromatic monofunctional isocyanate.

Suitable monofunctional isocyanates are for example n-hexylisocyanate, cyclohexyl isocyanate, co-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentyl-phenyl isocyanate, 4-t-butyl phenyl isocyanate, 1-naphthyl isocyanat In an embodiment of the invention the compound (F) is a branched, anunbranched aliphatic, an alicyclic and/or an aromatic monofunctional amine. Specific examples of the aliphatic monofunctional amine include hexylamine, heptylamine, octylamine, nonylamine, decylamine, undecylamine, dodecylamine, tridecylamine, tetradecylamine, pentadecylamine, hexadecylamine, heptadecyl. Examples include amine, octadecylamine, nonadecylamine, icosylamine, henecosylamine, docosylamin. Specific examples of the alicyclic monofunctional amine include cyclohexylamine, 2-methylcyclohexylamine, 3-methylcyclohexylamine, 4-methylcyclohexylamine, 2,3-dimethylcyclohexylamine, 2,4-dimethylcyclohexylamine, 2-ethylcyclohexylamine, 3-ethylcyclohexylamine, 4-ethylcyclohexylamine, 2-n-propylcyclohexylamine, 3-n-propylcyclohexylamine, 4-n-propylcyclohexylamine, 2-iso-propylcyclohexylamine, 3-iso-propylcyclohexylamine, 4-iso-propylcyclohexylamine, 2-n-butylcyclohexylamine, 3-n-butylcyclohexyl amine, 4-n-butylcyclohexyl Silamine, 2-iso-butylcyclohexylamine, 3-iso-butylcyclohexylamine, 4-iso-butylcyclohexylamine, 2-tert-butylcyclohexylamine, 3-tert-butylcyclohexylamine, 4-tert-butylcyclohexylamine, 2-n-octylcyclohexylamine, 3-n-octylcyclohexylamine, 4-n-octylcyclohexylamine, cyclohexylmethylamine, 2-methylcyclohexylmethylamine, 3-methylcyclohexylmethylamine, 4-methylcyclohexylmethylamine, dimethyl Cyclohexylmethylamine, trimethylcyclohexylmethylamine, methoxycyclohexylmethylamine, ethoxycyclohexylmethylamine, dimethyl Carboxymethyl cyclohexylmethyl amine, methoxy cyclohexylethylamine, dimethoxy cyclohexylethylamine, methylcyclohexylamine propylamine, dodecylamine cyclohexylamine.

Specific examples of the aromatic monofunctional amine include aniline, 1-naphthylamine, 2-naphthylamine, 1-aminoanthracene, o-toluidine, p-toluidine, m-toluidine, 2-ethylaniline, 3-ethylaniline, 4-Ethylaniline, 2-propylaniline, 3-propylaniline, 4-propylaniline, cumidine, 2-n-butylaniline, 3-n-butylaniline, 4-n-butylaniline, 2-isobutylaniline, 3-isobutyl Aniline, 4-isobutylaniline, 2-sec-butylaniline, 3-sec-butylaniline, 4-sec-butylaniline, 2-tert-butylaniline, 3-tert-butylaniline, 4-tert-butylaniline, 2-N-pentylaniline, 3-n-pentylaniline 4-n-pentylaniline, 2-isopentylaniline, 3-isopentylaniline, 4-isopentylaniline, 2-sec-pentylaniline, 3-sec-pentylaniline, 4-sec-pentylaniline, 2-tert-Pentylaniline, 3-tert-pentylaniline, 4-tert-pentylaniline, 2-hexylaniline, 3-hexylaniline, 4-hexylaniline, 2-heptylaniline, 3-heptylaniline, 4-heptylaniline, 2-Octylaniline, 3-octylaniline, 4-octylaniline, 2-nonylaniline, 3-nonylaniline, 4-nonylaniline, 2-decylaniline, 3-decylaniline, 4-decylaniline, cyclohexylaniline, diphenylamine, dimethylaniline, Diethylaniline, dipropylaniline, diisopropylaniline, di-n-butylaniline, di-sec-butylaniline, di-tert-butylaniline, trimethylaniline, triethylaniline, tripropylaniline, tri-tert-butylaniline, Anisidine, ethoxyaniline, dimethoxyaniline, diethoxyaniline, trimethoxyaniline, tri-n-butoxyaniline, benzylamine, methylbenzylamine, dimethylbenzylamine, trimethylbenzylamine, methoxybenzylamine, ethoxybenzylamine, dimethoxybenzylamine, α-phenylethylamine, β-phenylethylamine, methoxyphenylethylamine, dimethoxyphenylethylamine, α-phenylpropylamine, β Phenylpropylamine, .gamma. phenylpropylamine, methyl phenylpropylamine.

In an embodiment of the invention the compound (F) is at least one compound selected from the group consisting of 4-phenyl-1,3-dioxolan-2-one (styrene carbonate), 1,3-dioxolan-2-one (ethylene carbonate), 4-Methyl-1,3-dioxolan-2-one (propylene carbonate).

In a preferred embodiment of the invention the compound (F) is at least one compound selected from the group consisting of phenyl glycidyl ether, o-cresyl glycidyl ether, m-cresyl glycidyl ether, p-cresyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidyl ether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide, N-glycidyl phthalimide, and 4-tert-butylphenyl glycidyl ether.

In a preferred embodiment of the invention the compound (F) is 4-tert-butylphenyl glycidyl ether and/or phenyl glycidyl ether and/or o-cresyl glycidyl ether and/or styrene oxide.

In a preferred embodiment of the invention compound (D) and compound (F) are monofunctional epoxides.

In a more preferred embodiment of the invention compound (D) and compound (F) are 4-tert-butylphenyl glycidyl ether and/or phenyl glycidyl ether and/or o-cresyl glycidyl ether and/or styrene oxide.

In an embodiment of the method according to the invention, the compound (F) is present in an amount of ≥0.1 to ≤10.0 weight-%, preferably in an amount of ≥0.2 to ≤8.0 weight-%, more preferred ≥0.5 to ≤7.0 weight-%, based on the theoretical yield of thermoplastic polyoxazolidinone.

In an embodiment the method according to the invention is performed in the absence of a solvent (G) with a boiling point higher than 200° C., preferably higher than 190° C. and more preferably higher than 180° C. at 1 bar (absolute). Due to the absence of high amounts of high boiling solvent a negative impact subsequent extrusion and injection molding processes of the thermoplastic polyoxazolidinones can be reduced, such as unwanted foaming, unsuitable viscosity and explosive atmosphere. Therefore, the solvent that is in general necessary for the synthesis of the polyoxazolidinone should be quantitatively removed e.g. by distillation method below 1500 ppm at elevated temperatures and reduced pressures wherein the thermal decomposition of the polyoxazolidinone resulting in a higher polydispersity and an undesirable colouring of the desolvated polyoxazolidinone should be minimized to obtain desolvatised polyoxazolidinone with good thermoplastic properties and an improved thermostability.

Such solvents (G) include for example cyclic carbonate, such as ethylencarbonate or propylencarbonate, N-methylpyrrolidone (NMP) and sulfolane. The absence of this additional solvent (G) reduces the energy-intensive and time-consuming removal process, e.g. distillation, of this high boiling solvents.

Another aspect of the present invention is a thermoplastic polyoxazolidinone, obtainable by a method according to the invention, wherein the number average molecular weights Mn of the thermoplastic polyoxazolidinone is preferentially ≥500 to ≤500'000 g/mol, more preferred ≥1'000 to ≤50'000 g/mol and even more preferred ≥5'000 to ≤25'0000 g/mol as determined with gel permeation chromatography (GPC). GPC was performed on an Agilent 1100 Series instrument with N,N-dimethylacetamide (DMAC)+LiBr (1.7 g·L$^{-1}$) as the eluent, PSS GRAM analytical columns (1×100 Å, 2×3000 Å) from PSS, equipped with a refractive index (RI) detector. The column flow rate in all measurements was set to 1 mL·min$^{-1}$. For determining molecular weights, the calibration was performed with poly(styrene) standards (ReadyCal-Kit PS-Mp 370-2520000Da from PSS). The samples were analysed using PSS WinGPC UniChrom V 8.2 Software.

Preferably, the molar amount of mono-epoxide and/or mono-isocyanate compound added as compound (D) fulfils certain criteria with respect to the molar amount of bisepoxide compound (B) and diisocyanate compound (A). The ratio r is defined as the absolute value of the molar amount of compound (D) ($n_D$) to the difference between the molar amount of bisepoxide compound (B) ($n_{bisepoxide}$) and the molar amount of diisocyanate compound (A) ($n_{diisocyanate}$) according to the following formula (II)

$$r = |n_D / (n_{bisepoxide} - n_{diisocyanate})| \qquad (II)$$

is preferably in the range of ≥1.5 to ≤2.5, more preferably in the range of ≥1.9 to ≤2.1, and particularly preferred in the range of ≥1.95 to ≤2.05. Without being bound to a theory, all epoxide groups and all isocyanate groups will have reacted at the end of the reaction, when such an amount of chain regulator is being used.

As an alternative, an excess of the monofunctional isocyanate, the monofunctional epoxide, the cyclic carbonate, the monofunctional alcohol, the monofunctional amine preferred the monofunctional epoxide as compound (F) is added as chain regulator to the reaction mixture after the reaction between bisepoxide and diisocyanate has been completed. Without being bound to a theory, the terminal epoxide groups or the terminal isocyanate groups resulting from the reaction of the bisepoxide and the diisocyanate will be converted to inert end groups by reaction with the regulator. The excess amount of regulator is subsequently removed from the product, e.g., by extraction, precipitation, distillation, stripping or thin film evaporation.

The present invention further relates to a spun fibre, comprising a thermoplastic polyoxazolidinone according to the invention and a textile, comprising such a spun fiber.

The method according to the invention is suited for the synthesis of oxazolidinones with interesting properties for use, for example, as pharmaceutics or antimicrobiotics.

Thermoplastic polyoxazolidinones obtained by the method according to the invention are particularly suited as polymer building blocks in polyurethane chemistry. For example, epoxy-terminated oligomeric oxazolidinones (oligooxazolidinones) may be reacted with polyols or polyamines to form foams or thermosets. Such epoxy-terminated oligomeric oxazolidinones are also suited for the preparation of composite materials. Epoxy-terminated oligomeric oxazolidinones (oligooxazolidinones) may also be reacted with their NCO-terminated counterparts to form high molecular weight thermoplastic polyoxazolidinones, which are useful as transparent, high temperature-stable materials. Thermoplastic polyoxazolidinones with high molecular weight obtained by the method according to the invention are particularly suited as transparent, high temperature-stable thermoplastic materials.

The conventional additives for these thermoplastics, such as fillers, UV stabilizers, heat stabilizers, antistatics and pigments, can also be added in the conventional amounts to the thermoplastic polyoxazolidinones according to the invention; the mould release properties, the flow properties and/or the flame resistance can optionally also be improved by addition of external mould release agents, flow agents and/or flameproofing agents (e.g. alkyl and aryl phosphites and phosphates, alkyl- and arylphosphanes and low molecular weight carboxylic acid alkyl and aryl esters, halogen compounds, salts, chalk, quartz flour, glass fibres and carbon fibres, pigments and a combination thereof. Such compounds are described e.g. in WO 99/55772, p. 15-25, and in the corresponding chapters of the "Plastics Additives Handbook", ed. Hans Zweifel, 5th edition 2000, Hanser Publishers, Munich).

The thermoplastic polyoxazolidinones obtained according to the current invention have excellent properties regarding stiffness, hardness and chemical resistance.

They are also useful in polymer blends with other polymers such as polystyrene, high-impact polystyrene (polystyrene modified by rubber for toughening, usually polybutadiene), copolymers of styrene such as styrene-acrylonitrile copolymer (SAN), copolymers of styrene, alpha-methylstyrene and acrylonitrile, styrene-methyl methacrylate copolymers, styrene-maleic anhydride copolymers, styrene-maleimide copolymers, styrene-acrylic acid copolymers, SAN modified by grafting rubbers for toughening such as ABS (acrylonitrile-butadiene-styrene polymer), ASA (acrylonitrile-styrene-acrylate), AES (acrylonirile-EPDM-styrene), ACS (acrylonitrile-chlorinated polyethylene-stryrene) polymers, copolymers of styrene, alpha-methylstyrene and acrylonitrile modified with rubbers such as polybutadiene or EPDM, MBS/MABS (methyl methacrylate-styrene modified with rubber such as polybutadiene or EPDM), aromatic polyesters such as polyethylene terephthalate (PET), polybutylene terephthalate (PBT), polytrimethylene terephthalate (PTT), aliphatic polyamides such as PA6, PA6,6, PA4,6, PA 11 or PA 12, polylactic acid, aromatic polycarbonates such as the polycarbonate of bisphenol A, co-polycarbonates such as co-polycarbonates of bisphenol A and bisphenol TMC, polymethylmethacrylate (PMMA), polyvinylchloride, polymethyleneoxide (POM), polyphenylene ether, polyphenylene sulphide (PPS, polysulfones, polyetherimide (PEI), polyethylene, polypropylene.

They are also useful for blends in combination with the above polymers or others, for example blends of polycarbonate and ABS, polycarbonate and PET, polycarbonate and PBT, polycarbonate and ABS and PBT or polycarbonate and ABS and PBT.

The properties of the thermoplastic polyoxazolidinones according to this invention or blends with the above-mentioned polymers or others can also be modified by fillers such as glass fibers, hollow or solid glass spheres, silica (for example fumed or precipitated silica), talcum, calcium carbonate, titanium dioxide, carbon fibers, carbon black, natural fibers such as straw, flax, cotton or wood fibers.

Thermoplastic Polyoxazolidinones can be mixed with any usual plastics additive such as antioxidants, light stabilizers, impact modifiers, acid scavengers, lubricants, processing aids, anti-blocking additives, slip additives, antifogging additives, antistatic additives, antimicrobials, chemical blowing agents, colorants, optical brighteners, fillers and reinforcements as well as flame retardant additives.

Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., more specifically less than −10° C., or more specifically −40° to −80° C., and (ii) a rigid polymeric shell grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric C1-8 alkyl (meth)acrylates; elastomeric copolymers of C1-8 alkyl (meth)acrylates with butadiene and/or styrene; or combinations comprising at least one of the foregoing elastomers. materials suitable for use as the rigid phase include, for example, monovinyl aromatic monomers such as styrene and alpha-methyl styrene, and monovinylic monomers such as acrylonitrile, acrylic acid, methacrylic acid, and the C1-C6 esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 wt %, specifically 3 to 20 wt %, based on the total weight of the polymers in the flame retardant composition. An exemplary impact modifier comprises an acrylic polymer in an amount of 2 to 15 wt %, specifically 3 to 12 wt %, based on the total weight of the flame retardant composition.

The composition may also comprise mineral fillers. In an embodiment, the mineral fillers serve as synergists. The synergist facilitates an improvement in the flame retardant properties when added to the flame retardant composition over a comparative thermoplastic polyoxazolidinone composition that contains all of the same ingredients in the same quantities except for the synergist. Examples of mineral fillers are mica, talc, calcium carbonate, dolomite, wollastonite, barium sulfate, silica, kaolin, feldspar, barytes, or the like, or a combination comprising at least one of the foregoing mineral fillers. The mineral filler may have an average particle size of 0.1 to 20 micrometers, specifically 0.5 to 10 micrometers, and more specifically 1 to 3 micrometers. An exemplary mineral filler it talc having an average particle size of 1 to 3 micrometers.

The mineral filler is present in amounts of 0.1 to 20 wt %, specifically 0.5 to 15 wt %, and more specifically 1 to 5 wt %, based on the total weight of the flame retardant composition.

The thermoplastic polyoxazolidinones can also be colored with a whole range of soluble organic dyes and with pigment dyes, which can be either organic or inorganic.

Further possible uses of the thermoplastic polyoxazolidinones according to the invention are:

01. Housing for electrical appliances (e.g. household appliances, computers, mobile phones, display screens, television, . . . ), including transparent or translucent housing parts like lamp covers.
02. Light guide panels and BLUs
03. Optical Data Storage (CD, DVD, Blu-ray Discs)
04. electrically insulating materials for electrical conductors, for plug housings and plug connectors, carrier material for organic photoconductors, Chip boxes and chip supports, fuse encapsulation
05. Static dissipative/electrically conductive formulations for use in explosion protection applications and others with respective requirements
06. Optics, diffusers, reflectors, light guides as well as housings for LED and conventional Lighting, e.g. streetlights, industrial lamps, searchlights, traffic lights, . . .
07. Thermally conductive formulations for thermal management applications like heatsinks.
08. Applications for Automotive and other Transportation vehicles (cars, buses, trucks, railway, aircrafts, ships) as Glazing, also safety glazing, lighting (e.g. headlamp lenses, tail lights, turn signals, back-up lights, fog lights; bezels and reflectors), sun and panoramic roofs, cockpit canopies, cladding of railway or other cabins, Windscreens, interiors and exteriors parts (e.g. instrument covers, consoles, dashboards, mirror housings, radiator grilles, bumpers, spoilers),
09. EVSE and batteries
10. Metal substitution in gears, seals, supporting rings
11. Roof structures (e.g. for sports arenas, stations, conservatories, greenhouses)
12. windows (including theft-proof windows and projectile-resistant windows, teller's windows, barriers in banks),
13. partition walls
14. solar panels
15. Medical devices (components of blood pumps, auto-injectors and mobile medical-injection pumps, IV access devices, renal therapy and inhalation devices (such as nebulizers, inhalers) sterilisable surgical instruments, medical implants, oxygenators, dialyzers, . . . )
16. Foodcontact applications (tableware, dinnerware, glasses, tumblers, food containers, institutional food trays, water bottles, water filter systems)
17. sports articles, such as e.g. slalom poles or ski boot buckles.
18. household articles, such as e.g. kitchen sinks and letterbox housings.
19. safety applications (glasses, visors or optical corrective glasses, helmets, visors, riot gear (helmets and shields), safety panes)
20. Sunglasses, swimming goggles, SCUBA masks
21. Signs, displays, poster protection
22. Lightweight luggage
23. water fitting, pump impellors, thin hollow fibres for water treatment
24. Industrial pumps, valves and seals, connectors
25. Membranes
26. Gas separation
27. Coating applications (e.g. Anticorrosion paint, powder coating)

This application likewise provides the shaped articles and mouldings and extrudates from the polymers according to the invention.

EXAMPLES

The present invention will be further described with reference to the following examples without wishing to be limited by them.

Diisocyanate Compound (A)
MDI-1 4,4'-Methylene diphenyl diisocyanate, 98%, Covestro AG, Germany
MDI-2 Mixture of 4,4'-Methylene diphenyl diisocyanate, and 4,2'-Methylene diphenyl diisocyanate 98%, Covestro AG, Germany was used without further purification Epoxide Compound (B)
BADGE 2-[[4-[2-[4-(Oxiran-2-ylmethoxy)phenyl]propan-2-yl]phenoxy]methyl]oxirane (Bisphenol-A-diglycidylether), difunctional epoxide, D.E.R. 332 (Dow) was used without any further purification. (EEW: 171-175 g/eq.)

Catalyst (C)
TPPCl Tetraphenylphosphoniumchlorid (Sigma-Aldrich, 98%)
TPPBr Tetraphenylphosphoniumbromid (Sigma-Aldrich, 97%)
LiCl Lithiumchlorid (Sigma-Aldrich, ≥99.9%)

Compound (D) and (F)
BPGE para-tert.-butylphenyl glycidyl ether (ABCR Dr. Braunagel GmbH+Co.KG)

Solvents (E)
o-DCB Ortho-dichlorobenzene (o-DCB), purity 99%, anhydrous, was obtained from Sigma-Aldrich, Germany
TCB 1,2,4-trichlorobenzene (TCB), purity 99%, anhydrous, was obtained from Sigma-Aldrich, Germany Solvents (G)
Sulfolane Acros Organic, 99%
o-DCB, sulfolane, MDI-1, MDI-2, NMP, TPPCl, TPPBr, LiCl, BADGE, and BPGE were used as received without further purification. BADGE and sulfolane were used after melting at 50° C., while BPGE was stored at 7° C.

Characterisation of Thermoplastic Polyoxazolidinone

The average chain length of the thermoplastic polyoxazolidinones was controlled by the molar ratio of bisepoxide, diisocyanate and/or compound (D).

The formula below gives a general mathematical formula to calculate the average chain length n in the polymeric product obtained with a diisocyanate (A) and a bisepoxide (B):

$$n=(1+q)/(1+q-2pq) \qquad (III)$$

with $q=n_x/n_y \leq 1$ and x,y=bisepoxide (B) or diisocyanate (A)
and with the conversion p
whereby $n_x$ and $n_y$ are the molar amounts of bisepoxide or diisocyanate, respectively.

The average molecular weight M of the thermoplastic polyoxazolidinones can be calculated by the formula given below $$M=n*((M_A+M_B)/2)+(2*M_D) \qquad (IV)$$

With $M_A$, $M_B$, and $M_D$ being the molar masses of the compounds (A), (B), and (D).

Solid state IR analyses were performed on a Bruker ALPHA IR spectrometer equipped with a diamond probe head. The software OPUS 7.5 was used for data treatment. A background spectrum was recorded against ambient air. Thereafter, a small sample of the thermoplastic polyoxazolidinone (2 mg) was applied to the diamond probe and the IR spectrum recorded averaging over 24 spectra obtained in the range of 4000 to 400 cm$^{-1}$ with a resolution of 4 cm$^{-1}$.

The OXA:PIR ratio was calculated by means of the signal height within the IR-spectroscopy. Therefore the characteristic carbonyl band at 1750 cm$^{-1}$ was used for the oxazolidinone group, while the signal at 1715 cm$^{-1}$ was used for the determination of the isocyanurate amount. The OXA:PIR ratio was calculated based on following formula:

$$OXA{:}PIR = OXA{:}PIR = \frac{\text{hight of signal at } 1750 \text{ cm}^{-1}}{\text{hight of signal at } 1715 \text{ cm}^{-1}} \qquad (V)$$

The determination of the number average molecular weights, weight average molecular weights and the polydispersity index were carried out by gel permeation chromatography (GPC). GPC was performed on an Agilent 1100 Series instrument with N,N-dimethylacetamide (DMAC)+ LiBr (1.7 g L$^{-1}$) as the eluent, PSS GRAM analytical columns (1×100 Å, 2×3000 Å) from PSS, equipped with a refractive index (RI) detector. The column flow rate in all measurements was set to 1 mL·min$^{-1}$. For determining molecular weights, the calibration was performed with poly (styrene) standards (ReadyCal-Kit PS-Mp 370-2520000 Da from PSS). The samples were analysed using PSS WinGPC UniChrom V 8.2 Software.

The determination of the amount of residual solvents within the thermally treated polymer samples was evaluated via GC-analysis. Therefore, 20-30 mg of the polymer sample was weight into a GC-vial and 20-30 mg of a stock solution of 1.125 wt. % tetradecane in DMAC were added. 1 mL of pure DMAc was added and the sample was vortexed to make it homogeneous. Measurements were conducted using a 7890A GC System from Agilent Technologies equipped with a Agilent 19091Z-115HP-1 methyl-siloxane column (48 m×320 µm×0.52×m). The front inlet was heated to 200° C., while the oven temperature was 100° C. Helium was used as carrier gas and 1 µL of the sample was injected by applying a 1:10 split ratio. A FID detector employed for analysis. The solvent retention times were the following: 1.56 min (ethanol), 3.804 min (NMP), 3.992 min (o-DCB), 4.900 min (sulfolane), and 6.450 min (tetradecane (standard)).

The Gardner color index was determined by using a Lico 620 from Hach. Therefore, sample of the product mixture was filled into a cuvette which was subsequently analyzed following the DIN EN ISO 1557.

Example 1 (Comparative): Reaction of Methylene Diphenyl Diisocyanate (MDI-1) as Diisocyanate (A) with Bisphenol A Diglycidyl Ether (BADGE) as Diepoxide (B), Using Tetraphenylphosphonium Bromide (TPPBr) as Catalyst (C), Para-Tert-Butylphenyl Glycidyl Ether (BPGE) as Compound (D) Added in Step (α) and as Compound (F) Added in Step (β) and o-DCB as Solvent (E) and No Solvent (G)

Under a continuous flow of nitrogen, a glass flask (500 mL) was charged with tetraphenylphosphonium bromide (TPPBr, 0.9882 g) and ortho-dichlorobenzene (92 mL). Subsequently, the mixture was heated to 175° C. and stirred for 15 min. A glass bottle (250 mL) was charged with methylene diphenyl diisocyanate (MDI-1) (29.4931 g), Bisphenol A glycidyl ether (38.5141 g), para-tert-butylphenyl glycidyl ether (1.9449 g), and ortho-dichlorobenzene (77 mL). The monomer solution was added slowly to the catalyst solution within 90 min. After the addition was finished, the reaction was stirred at 175° C. for another 30 min. After a total reaction time of 120 min, para-tert-butylphenyl glycidyl ether (4.8637 g), dissolved in ortho-dichlorobenzene (10 mL), was added to the reaction solution. After the addition the reaction was stirred at 175° C. for another 180 min. The completion of the reaction was confirmed by the absence of the isocyanate band (2260 cm$^{-1}$) in the IR spectrum of the reaction mixture. Subsequently, the mixture was allowed to cool down to ambient temperature. The precipitation of the polymer was performed in ethanol at ambient temperature: Therefore, the product mixture (ca. 50 mL) was added slowly into 200 mL of ethanol and milled with an Ultra-Turrax dispersing instrument from IKA. The product was washed with ethanol, filtered, and dried at ambient temperature overnight. Subsequently, the product was dried under vacuum (50 mbar) at 160° C. for 6 h.

For the purely thermal workup, the crude reaction mixture was dried under vacuum (50 mbar) at 200° C. for 16 h.

Example 2 (Comparative): Reaction of Methylene Diphenyl Diisocyanate (MDI-1) as Diisocyanate (A) with Bisphenol A Diglycidyl Ether (BADGE) as Diepoxide (B), Using Tetraphenylphosphonium Chloride (TPPCl) as Catalyst (C), and o-DCB as Solvent (E) and No Solvent (G)

Under a continuous flow of nitrogen, a glass flask (500 mL) was charged with tetraphenylphosphonium chloride (TPPCl, 0.8834 g) and ortho-dichlorobenzene (92 mL). Subsequently, the mixture was heated to 175° C. and stirred for 15 min. A glass bottle (250 mL) was charged with methylene diphenyl diisocyanate (MDI-1) (29.4931 g), Bisphenol A glycidyl ether (38.5141 g), and ortho-dichlorobenzene (77 mL). The monomer solution was added slowly to the catalyst solution within 90 min. After the addition was finished, the reaction was stirred at 175° C. for another 210 min. The completion of the reaction was confirmed by the absence of the isocyanate band (2260 cm$^{-1}$) in the IR spectrum of the reaction mixture. Subsequently, the mixture was allowed to cool down to ambient temperature. The precipitation of the polymer was performed in ethanol at ambient temperature: Therefore, the product mixture (ca. 50 mL) was added slowly into 200 mL of ethanol and milled with an Ultra-Turrax dispersing instrument from IKA. The product was washed with ethanol, filtered, and dried at ambient temperature overnight. Subsequently, the product was dried under vacuum (50 mbar) at 160° C. for 6 h.

Example 3: Reaction of Methylene Diphenyl Diisocyanate (MDI-1) as Diisocyanate (A) with Bisphenol A Diglycidyl Ether (BADGE) as Diepoxide (B), Using Tetraphenylphosphonium Bromide (TPPBr) as Catalyst (C-1) and Catalyst (C-2), Para-Tert-Butylphenyl Glycidyl Ether (BPGE) as Compound (D) Added in Step (α) and as Compound (F) Added in Step (β) and o-DCB as Solvent (E), and No Solvent (G)

Under a continuous flow of nitrogen, a glass flask (500 mL) was charged with tetraphenylphosphonium bromide (TPPBr, 0.4941 g) and ortho-dichlorobenzene (92 mL). Subsequently, the mixture was heated to 175° C. and stirred for 15 min. A glass bottle (250 mL) was charged with methylene diphenyl diisocyanate (MDI-1) (29.4931 g), Bisphenol A glycidyl ether (38.5141 g), para-tert-butylphenyl glycidyl ether (1.9449 g), and ortho-dichlorobenzene (77 mL). The monomer solution was added slowly to the catalyst solution within 90 min. After the addition was finished, a second dose of TPPBr (0.4941 g) was added before the reaction mixture was stirred at 175° C. for another 30 min. After a total reaction time of 120 min, para-tert-butylphenyl glycidyl ether (4.8637 g), dissolved in ortho-dichlorobenzene (10 mL), was added to the reaction solution before the reaction was stirred at 175° C. for another 180 min. The completion of the reaction was confirmed by the absence of the isocyanate band (2260 cm$^{-1}$) in the IR spectrum of the reaction mixture. Subsequently, the mixture was allowed to cool down to ambient temperature. The precipitation of the polymer was performed in ethanol at ambient temperature: Therefore, the product mixture (ca. 50 mL) was added slowly into 200 mL of ethanol and milled with an Ultra-Turrax dispersing instrument from IKA. The product was washed with ethanol, filtered, and dried at ambient temperature overnight. Subsequently, the product was dried under vacuum (50 mbar) at 160° C. for 6 h.

For the purely thermal workup, the crude reaction mixture was dried under vacuum (50 mbar) at 200° C. for 16 h Example 4: Stepwise Reaction: First Reaction of Methylene Diphenyl Diisocyanate (MDI-2) as Diisocyanate (A) with Bisphenol A Diglycidyl Ether (BADGE) as Diepoxide (B), Using Tetraphenylphosphonium Chloride (TPPCl) as Catalyst (C-1) Towards a Prepolymer. Second Step: Chain Prolongation Using Methylene Diphenyl Diisocyanate (MDI-1) as Diisocyanate (A), Tetraphenylphosphonium Chloride (TPPCl) Catalyst (C-2), Para-Tert-Butylphenyl Glycidyl Ether (BPGE) as Compound (D) Added in Step (α) and as Compound (F) Added in Step (β), and o-DCB as Solvent (E) and No Solvent (G)

Under a continuous flow of nitrogen, a glass flask (500 mL) was charged with tetraphenylphosphonium chloride (0.9718 g) and Bisphenol A diglycidylether (220.6453 g). Subsequently, the mixture was stirred and heated to 160° C. A glass bottle (250 mL) was charged with methylene diphenyl diisocyanate (MDI-2) (71.3734 g). The methylene diphenyl diisocyanate was added slowly to the catalyst solution within 30 min. The reaction was stirred for another 30 min at 160° C., transferred to a alumina tray and allowed to cool down to ambient temperature.

Under a continuous flow of nitrogen, a fresh glass flask (500 mL) was charged with 50 g of the synthesized prepolymer, ortho-dichlorobenzene (138 mL) and tetraphenylphosphonium chloride (0.442 g). The solution was stirred and heated to 175° C. before a mixture of methylene diphenyl diisocyanate (MDI-1) (16.655 g), para-tert-butylphenyl glycidyl ether (1.9014 g), and ortho-dichlorobenzene (46 mL) was dosed within 60 min to the preheated solution. After the addition was completed the reaction mixture was stirred at 175° C. for another 30 min. After a total reaction time of 90 min, para-tert-butylphenyl glycidyl ether (4.7536 g), dissolved in ortho-dichlorobenzene (11 mL), was added to the reaction solution before the reaction was stirred at 175° C. for another 180 min. The completion of the reaction was confirmed by the absence of the isocyanate band (2260 cm$^{-1}$) in the IR spectrum of the reaction mixture. Subsequently, the mixture was allowed to cool down to ambient temperature. The precipitation of the polymer was performed in ethanol at ambient temperature. Therefore, the product mixture (ca. 50 mL) was added slowly into 200 mL of ethanol and milled with an Ultra-Turrax dispersing instrument from IKA. The product was washed with ethanol, filtered, and dried at ambient temperature overnight. Subsequently, the product was dried under vacuum (50 mbar) at 160° C. for 6 h.

For the purely thermal workup, the crude reaction mixture was dried under vacuum (50 mbar) at 200° C. for 16 h Example 5: Stepwise Reaction: First Reaction of Methylene Diphenyl Diisocyanate (MDI-2) as Diisocyanate (A) with Bisphenol A Diglycidyl Ether (BADGE) as Diepoxide (B), Using Tetraphenylphosphonium Bromide (TPPBr) as Catalyst (C-1) Towards a Prepolymer. Second Step: Chain Prolongation Using Methylene Diphenyl Diisocyanate (MDI-1) as Diisocyanate (A), Tetraphenylphosphonium Bromide (TPPBr) Catalyst (C-2), Para-Tert-Butylphenyl Glycidyl Ether (BPGE) as Compound (D) Added in Step (α) and as Compound (F) Added in Step (β), and o-DCB as Solvent (E) and No Solvent (G)

Under a continuous flow of nitrogen, a glass flask (500 mL) was charged with tetraphenylphosphonium bromide (1.087 g) and Bisphenol A diglycidylether (220.6453 g). Subsequently, the mixture was stirred and heated to 160° C. A glass bottle (250 mL) was charged with methylene diphenyl diisocyanate (MDI-2) (79.3218 g). The methylene diphenyl diisocyanate was added slowly to the catalyst solution within 30 min. The reaction was stirred for another 30 min at 160° C., transferred to a alumina tray and allowed to cool down to ambient temperature.

Under a continuous flow of nitrogen, a fresh glass flask (500 mL) was charged with 50 g of the synthesized prepolymer, ortho-dichlorobenzene (138 mL) and tetraphenylphosphonium bromide (0.494 g). The solution was stirred and heated to 175° C. before a mixture of methylene diphenyl diisocyanate (MDI-1) (14.889 g), para-tert-butylphenyl glycidyl ether (1.8505 g), and ortho-dichlorobenzene (46 mL) was dosed within 60 min to the preheated solution. After the addition was completed the reaction mixture was stirred at 175° C. for another 30 min. After a total reaction time of 90 min, para-tert-butylphenyl glycidyl ether (4.6263 g), dissolved in ortho-dichlorobenzene (11 mL), was added to the reaction solution before the reaction was stirred at 175° C. for another 180 min. The completion of the reaction was confirmed by the absence of the isocyanate band (2260 $cm^{-1}$) in the IR spectrum of the reaction mixture. Subsequently, the mixture was allowed to cool down to ambient temperature. The precipitation of the polymer was performed in ethanol at ambient temperature. Therefore, the product mixture (ca. 50 mL) was added slowly into 200 mL of ethanol and milled with an Ultra-Turrax dispersing instrument from IKA. The product was washed with ethanol, filtered, and dried at ambient temperature overnight. Subsequently, the product was dried under vacuum (50 mbar) at 160° C. for 6 h.

For the purely thermal workup, the crude reaction mixture was dried under vacuum (50 mbar) at 200° C. for 16 h Example 6 (Comparative): Stepwise Reaction: First Reaction of Methylene Diphenyl Diisocyanate (MDI-2) as Diisocyanate (A) with Bisphenol A Diglycidyl Ether (BADGE) as Diepoxide (B), Using Tetraphenylphosphonium Chloride (TPPCl) as Catalyst (C-1) Towards a Prepolymer. Second Step: Chain Prolongation Using Methylene Diphenyl Diisocyanate (MDI-1) as Diisocyanate (A), Para-Tert-Butylphenyl Glycidyl Ether (BPGE) as Compound (D) Added in Step (α) and as Compound (F) Added in Step (β), and o-DCB as Solvent (E) and No Solvent (G)

Under a continuous flow of nitrogen, a glass flask (500 mL) was charged with tetraphenylphosphonium chloride (0.9718 g) and Bisphenol A diglycidylether (220.6453 g). Subsequently, the mixture was stirred and heated to 160° C. A glass bottle (250 mL) was charged with methylene diphenyl diisocyanate (MDI-2) (71.3734 g). The methylene diphenyl diisocyanate was added slowly to the catalyst solution within 30 min. The reaction was stirred for another 30 min at 160° C., transferred to a alumina tray and allowed to cool down to ambient temperature.

Under a continuous flow of nitrogen, a fresh glass flask (500 mL) was charged with 50 g of the synthesized prepolymer and ortho-dichlorobenzene (138 mL). The solution was stirred and heated to 175° C. before a mixture of methylene diphenyl diisocyanate (MDI-1) (16.655 g), para-tert-butylphenyl glycidyl ether (1.9014 g), and ortho-dichlorobenzene (46 mL) was dosed within 60 min to the preheated solution. After the addition was completed the reaction mixture was stirred at 175° C. for another 30 min. After a total reaction time of 90 min, para-tert-butylphenyl glycidyl ether (4.7536 g), dissolved in ortho-dichlorobenzene (11 mL), was added to the reaction solution before the reaction was stirred at 175° C. for another 180 min. The reaction showed still an intense isocyanate band (2260 $cm^{-1}$) in the IR spectrum, suggesting only minor conversion of the added methylene diphenyl diisocyanate. The mixture was allowed to cool down to ambient temperature. The precipitation of the polymer was performed in ethanol at ambient temperature. Therefore, the product mixture (ca. 50 mL) was added slowly into 200 mL of ethanol and milled with an Ultra-Turrax dispersing instrument from IKA. The product was washed with ethanol, filtered, and dried at ambient temperature overnight. Subsequently, the product was dried under vacuum (50 mbar) at 160° C. for 6 h.

Example 7 (Comparative): Reaction of Methylene Diphenyl Diisocyanate (MDI-1) as Diisocyanate (A) with Bisphenol A Diglycidyl Ether (BADGE) as Diepoxide (B), using LiCl as Catalyst (C), Para-Tert-Butylphenyl Glycidyl Ether (BPGE) as Compound (D) Added in Step (α) and as Compound (F) Added in Step (β) and TCB as Solvent (E) and No Solvent (G)

Under a continuous flow of nitrogen, a glass flask (500 mL) was charged with tetraphenylphosphonium chloride (LiCl, 0.0999 g) and 1,2,4-trichlorobenzene (82 mL). Subsequently, the mixture was heated to 185° C. and stirred for 15 min. A glass bottle (250 mL) was charged with methylene diphenyl diisocyanate (MDI-1) (29.4931 g), Bisphenol A glycidyl ether (38.5141 g), para-tert-butylphenyl glycidyl ether (1.9449 g), and 1,2,4-trichlorobenzene (68 mL). The monomer solution was added slowly to the catalyst solution within 90 min. After the addition was finished, the reaction was stirred at 185° C. for another 30 min. After a total reaction time of 120 min, para-tert-butylphenyl glycidyl ether (4.8637 g), dissolved in 1,2,4-trichlorobenzene (10 mL), was added to the reaction solution. After the addition the reaction was stirred at 185° C. for another 180 min. The reaction showed still an intense isocyanate band (2260 cm$^{-1}$) in the IR spectrum, suggesting no or only minor conversion of the methylene diphenyl diisocyanate. Subsequently, the mixture was allowed to cool down to ambient temperature. As no product (oxazolidinone band at 1750 cm$^{-1}$) no further workup was conducted.

wherein the process comprises:
(α) reacting of the diisocyanate compound (A) with the bisepoxide compound (B) in the presence of the catalyst (C) and the compound (D) that is optionally in the solvent (E) to form an intermediate compound; and
(β) reacting the compound (F) with the intermediate compound formed in step (α).

2. The process according to claim 1, wherein the process is conducted in the absence of a solvent (G), wherein the solvent (G) has a boiling point higher than 200° C. at 1 bar (absolute).

TABLE

Comparison of the results of Examples 1 to 9:

| Ex. | Post Treatment | (A) | (B) | (C) | (D) | (E) | (F) | (G) | Oxa/PIR | $M_P$ [g/mol] | PDI | Solvent Amount [ppm] | $\Delta M_P$ 200/290° C. | Colour Gardener |
|---|---|---|---|---|---|---|---|---|---|---|---|---|---|---|
| 1 (Comp.) | After syn 200° C. | MDI-1 | BADGE | TPPBr | BPGE | o-DCB | BPGE | — | 5.5 | 29170 | 5.9 | Reaction mixture | | 1.3 |
| | 16 h | | | | | | | | 5.6 | 29110 | 5.6 | 633 | 60 | 1.8 |
| 2 (Comp.) | After syn. | MDI-1 | BADGE | TPPCl | — | o-DCB | — | — | 4.2 | 60020 | 14.1 | Reaction mixture | | 2.0 |
| 3 | After syn. 200° C. | MDI-1 | BADGE | TPPBr | BPGE | o-DCB | BPGE | — | 5.9 | 26600 | 3.8 | Reaction mixture | | 3.0 |
| | 16 h | | | | | | | | 5.9 | 25970 | 3.8 | 0 | 650 | 3.6 |
| 4 | After syn. 200° C. | MDI-2/ MDI-1 | BADGE | TPPCl | BPGE | o-DCB | BPGE | — | 6.6 | 30340 | 3.6 | Reaction mixture | | 0.8 |
| | 16 h | | | | | | | | 6.7 | 30360 | 3.4 | 0 | 20 | 1.0 |
| 5 | After syn 200° C. | MDI-2/ MDI-1 | BADGE | TPPBr | BPGE | o-DCB | BPGE | — | 6.4 | 19610 | 4.0 | Reaction mixture | | 0.9 |
| | 16 h | | | | | | | | 6.6 | 21380 | 3.7 | 970 | 1770 | 1.0 |
| 6(Comp.) | After syn | MDI-1 | BADGE | TPPCl | BPGE | o-DCB | BPGE | — | 3.5 | 987 | 1.9 | Reaction mixture | | — |
| 7 (Comp.) | After syn | MDI-1 | BADGE | LiCl | BPGE | TCB | BPGE | — | — | — | — | — | — | — |

PDI Polydispersity index (PDI) defined as ratio of the weight average molecular weight and the number average molecular weight determined by GPC
ΔMp Change of the peak molecular weight after drying procedure, calculated as the ratio of the number average molecular weights for the polyoxazolidone compounds according to the following formula: ΔMp = | ($M_p$(200° C. or 290° C.) − $M_n$(S (after synthesis)) |
Solvent amount: determined via GC-analysis as described in the "characterization of the polyoxazolidinone" section.
Color number: value refers to the Gardner colour scale and was determined as described "characterization of the polyoxazolidinone" section.
Mp(S), Mp(200° C.), and Mp(290° C.) Peak molecular weights for the polyoxazolidone compounds after synthesis (S) and after treatment at 200° C. for 16 h or 290° C. for 3 h.
Solvent amount of the reaction mixture after polyoxazolidinone synthesis (after syn): Exemplary for example 1: 75.6 wt % o-DCB, 0.3 wt % TPPBr, 9.5 wt % MDI-1, 12.4 wt % BADGE, 2.2 wt % BPGE.

The invention claimed is:

1. A process for producing a thermoplastic polyoxazolidinone comprising copolymerization of a diisocyanate compound (A) with a bisepoxide compound (B) in the presence of a catalyst (C), a compound (D), a compound (F) optionally in a solvent (E);
wherein the catalyst (C) is represented by the formula (I)

$$[A]^+{}_n[Y]^{n-} \quad (I)$$

wherein n is an integer having a value of 1, 2, or 3;
wherein [A]$^+$ is a quaternary ammonium, quaternary phosphonium and/or quaternary stibonium;
wherein [Y]$^{n-}$ is a monovalent, divalent or trivalent anion;
wherein the compound (D) comprises at least one of a monofunctional isocyanate, a monofunctional epoxide, a cyclic carbonate, a monofunctional alcohol, a monofunctional amine, or a combination thereof; and
wherein the compound (F) comprises at least one of a monofunctional isocyanate, a monofunctional epoxide, a cyclic carbonate, a monofunctional alcohol, a monofunctional amine, or a combination thereof;
wherein the catalyst (C) is added in at least two portions comprising a first portion (C-1) and a second portion (C-2), and 3. The process according to claim 1, wherein catalyst (C) comprises at least one of a tetraalkylphosphonium halogenide, a tetracycloalkylphosphonium halogenide, a tetraarylphosphonium halogenide, a tetraalkylammonium halogenide, a tetracycloalkylammonium halogenide, and/or a tetraarylammonium halogenide.

4. The process according to claim 1, wherein catalyst (C) is at least one compound selected from the group consisting of tetraphenylphosphonium chloride, tetraphenylphosphonium bromide, tetraphenylphosphonium iodide, bis(triphenylphosphine) iminium chloride, tetraphenylphosphonium nitrate, and tetraphenylphosphonium carbonate.

5. The process according to claim 1, wherein step (α) comprises:
(α-1) placing the solvent (E) and the catalyst (C) in a reactor to provide a mixture (α-1),
(α-2) placing the compound (A), the bisepoxide compound (B) and the compound (D) in a second vessel to provide a mixture (α-2), and
(α-3) adding the mixture (α-2) to the mixture (α-1) and forming a copolymerization reaction product.

6. The process according to claim 5, wherein the first portion (C-1) of the catalyst (C) is added in step (α-1).

7. The process according to claim 5, wherein step (α) further comprises:
(α-4) adding the second portion (C-2) of the catalyst (C) to the mixture resulting from step (α-3).

8. The process according to claim 5, wherein an epoxy-terminated oxazolidone-based prepolymer is formed in step (α-3).

9. The process according to claim 8, wherein the epoxy-terminated oxazolidone-based prepolymer formed in step (α-3) is the copolymerization reaction product of a first portion (A-1) of the diisocyanate compound (A) with the bisepoxide compound (B) in the presence of the first portion (C-1) of the catalyst (C) optionally in the solvent (E), wherein the molar ratio of the epoxy groups of the bisepoxide compound (B) to the isocyanate groups of the first portion (A-1) of the diisocyanate compound (A) is from 1.1:1 to less than 25:1.

10. The process according to claim 8, wherein the epoxy-terminated oxazolidone-based prepolymer is formed in the absence of the solvent (E).

11. The process according to claim 7, wherein step (α-4) comprises adding a second portion (A-2) of the diisocyanate compound (A), the compound (D) in the solvent (E).

12. The process according to claim 1, wherein the process is conducted in the presence of the solvent (E) wherein the solvent (E) is one or more compounds selected from the group consisting of chlorobenzene, an isomer of dichlorobenzene, dimethylformamide, N,N-dimethylacetamide, tetrahydrofurane, acetone, methyl ethyl ketone, 1,2-dimethoxyethane, 1-methoxy-2-(2-methoxyethoxy)ethane, and an isomer of dioxane.

13. The process according to claim 1 wherein compound (D) and compound (F) are monofunctional epoxides.

14. A thermoplastic polyoxazolidinone produced by the process according to claim 1, wherein the thermoplastic polyoxazolidinone has a number average molecular weight Mn from ≥500 to ≤500,000 g/mol as determined with gel permeation chromatography (GPC).

15. The process according to claim 1, wherein $[A]^+$ is a quaternary phosphonium.

16. The process according to claim 1, wherein $[Y]^{n-}$ is a monovalent anion.

17. The process according to claim 1, wherein the compound (D) comprises a monofunctional epoxide.

18. The process according to claim 1, wherein the compound (F) comprises a monofunctional epoxide.

19. The process according to claim 3, wherein catalyst (C) comprises a tetraalkylphosphonium halogenide, a tetracycloalkylphosphonium halogenide, a tetraarylphosphonium halogenide, or any combination thereof.

20. The process according to claim 4, wherein catalyst (C) is at least one compound selected from the group consisting of tetraphenylphosphonium chloride, tetraphenylphosphonium bromide and tetraphenylphosphonium iodide.

* * * * *